J. P. HARRIS.
Shovel-Plow.
No. 26,033.
Patented Nov 8, 1859.
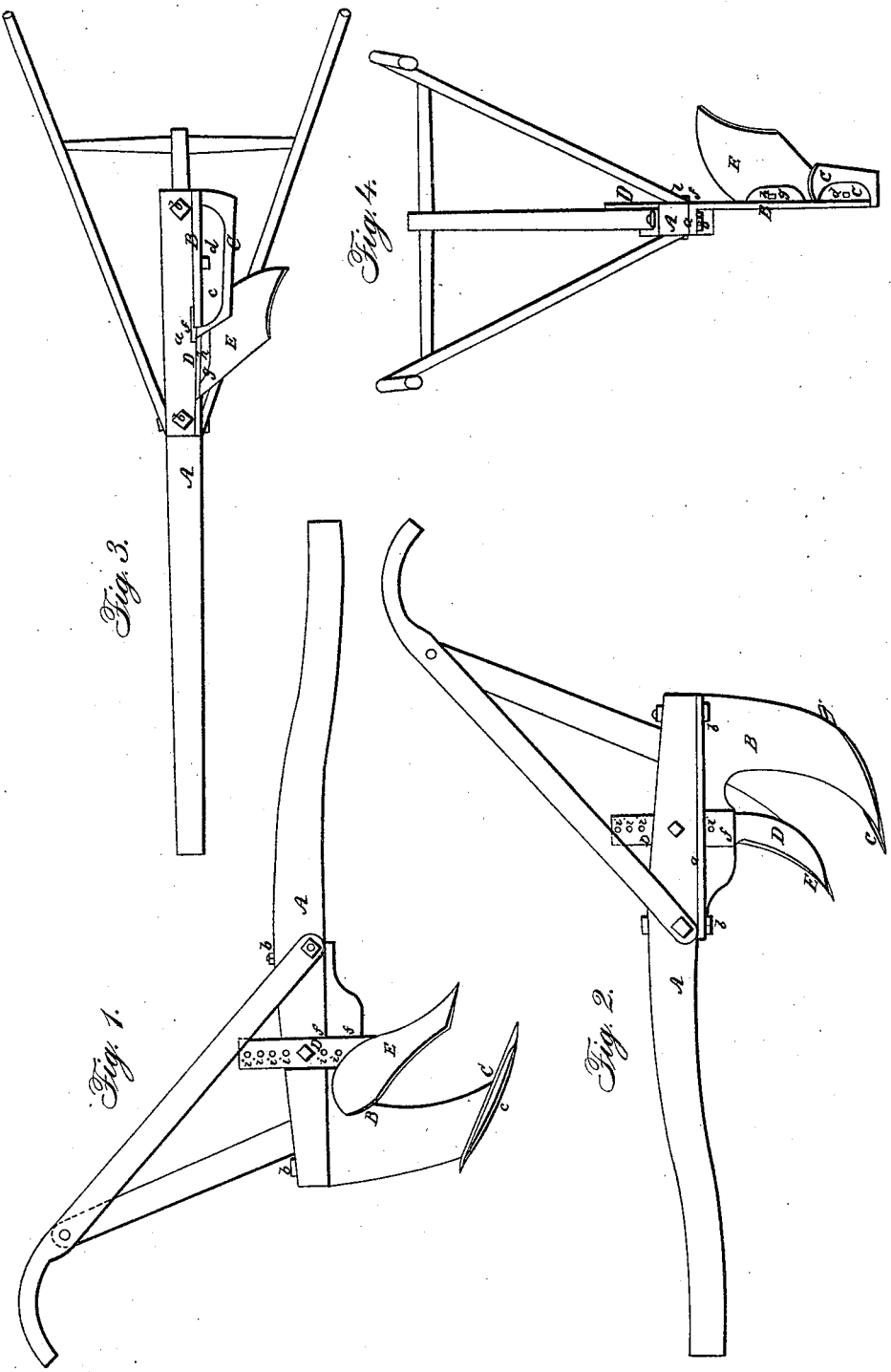

UNITED STATES PATENT OFFICE.

J. P. HARRIS, OF BYHALIA, MISSISSIPPI.

IMPROVEMENT IN PLOWS.

Specification forming part of Letters Patent No. 26,033, dated November 8, 1859.

*To all whom it may concern:*

Be it known that I, J. P. HARRIS, of Byhalia, in the county of Marshall and State of Mississippi, have invented a new and Improved Plow; and I do hereby declare that the following is a full and exact description thereof, reference being had to the accompanying drawings, making part of this specification.

Figure 1 is a right-side elevation of the plow; Fig. 2, a left-side elevation thereof; Fig. 3, a plan of the bottom; Fig. 4, a rear elevation.

Like letters designate corresponding parts in all the figures.

To the under side of the beam A the landside B is secured by means of bolts $b\ b$ passing through a flange, $a$, on the upper edge of the landside, and through the beam. The landside is constructed as shown, and is provided with a projection, $c$, to which a subsoil point or share, C, is attached, substantially as shown in the drawings. In the right side of the beam is formed a notch or groove, $f$, into which is fitted an adjustable shank, D, in the manner represented. A mold-board, E, is attached to this shank by means of a projection, $g$, on the shank, and of a bolt or bolts, $h$. The shank is adjusted to any height by means of a set of holes, $i\ i$, therein, and of a bolt, $l$, passing through one of them and a corresponding hole or holes in the beam A.

By the above-described simple construction a subsoil-plow is produced having at the same time a mold-board adjustable to any height desired, the whole being very convenient and cheap, strong, and durable. The mold-board is distinct from the subsoil-share, so that either may be used separately. The subsoil-share follows the mold-board, so that less power is required to draw the plow than when it precedes the mold-board. The subsoil-share may also be used alone for simply cultivating or stirring the ground, or as a mole plow in draining.

I am aware that adjustable subsoil-points have been used in connection with a fixed and permanent furrow or mold-board plow, and that an adjustable and removable cutter or small clearing-share preceding the mold-board has before been employed. Therefore I do not claim any such arrangement or combination; but I not aware that an adjustable and removable mold-board capable of being employed as a complete plow separately, and arranged so as to turn a furrow at any desired depth, has been used in combination with a subsoil and cultivating plow or share situated behind the same. Therefore

What I claim as my invention, and desire to secure by Letters Patent, is—

The combination of the separately adjustable and removable mold-board E with a subsoil-share, C, situated behind and below it, the said subsoil-share being also separately removable to allow the separate use of said mold-board, substantially as specified.

In witness that the above is a true specification of my improved plow I hereunto set my hand in presence of two subscribing witnesses.

J. P. HARRIS.

Witnesses:
　H. C. COLLIER,
　I. H. ALLEY.